May 26, 1970  D. J. NEWTON  3,514,718
APPARATUS FOR LINEARIZING THE OUTPPUT FREQUENCY VARIATION RATE
OF VOLTAGE TUNABLE OSCILLATORS OR THE LIKE
Filed Aug. 30, 1967
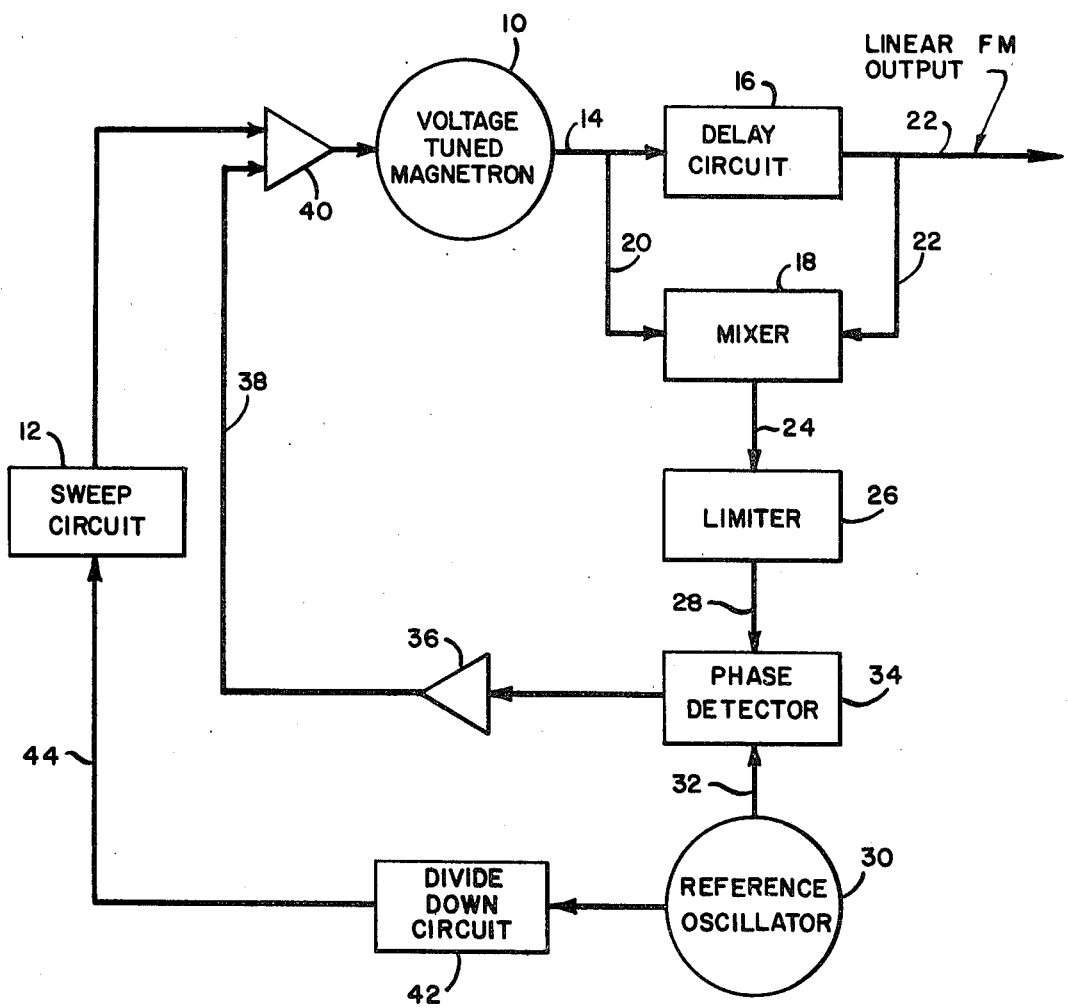
INVENTOR
DANIEL J. NEWTON.
BY
ATTORNEY United States Patent Office 3,514,718
Patented May 26, 1970

3,514,718
APPARATUS FOR LINEARIZING THE OUTPUT FREQUENCY VARIATION RATE OF VOLTAGE TUNABLE OSCILLATORS OR THE LIKE
Daniel J. Newton, Depew, N.Y., assignor to Cornell Aeronautical Laboratory, Inc., Buffalo, N.Y., a corporation of New York
Filed Aug. 30, 1967, Ser. No. 664,473
Int. Cl. H03c *3/08, 3/32*
U.S. Cl. 332—5                    8 Claims

ABSTRACT OF THE DISCLOSURE

A system for maintaining a voltage on a voltage tuned magnetron which produces a linear frequency modulated output utilizing a nondispersive delay circuit on the magnetron output which in conjunction with a mixer and a reference oscillator senses deviations from linearity in the magnetron output, and corrects the input voltage to the magnetron in accordance with such deviations.

BACKGROUND OF THE INVENTION

The present invention relates to frequency modulated continuous wave (FM–CW) radar systems and, more particularly, to an improved transmission apparatus for use in such systems.

FM–CW radar systems are known wherein a linearly variable frequency signal is continuously transmitted and reflected from one or more moving or stationary targets. If the target is stationary, a beat note or frequency difference signal of constant frequency will be formed by the receiving equipment. This frequency difference is directly proportional to the range of the target. With multiple targets, the detector output contains a number of beat frequencies, one corresponding to each target range present.

Typically FM–CW radar systems can utilize a voltage tunable microwave oscillator such as a cavity magnetron to generate the variable frequency oscillations. With present voltage tunable magnetrons FM–CW systems, the radar ranges at which high resolution (of the order of three inches) can be achieved have been limited to a few hundred feet. The major limitation to obtaining high range resolution at exceedingly longer radar ranges (of the order of miles) is the nonlinearities inherent in the generation of the linear frequency modulation of the microwave oscillator.

SUMMARY OF THE INVENTION

The foregoing limitation present in linear FM–CW radars employing voltage tunable magnetrons and the like is overcome according to the present invention by the provision of apparatus for linearizing the output frequency variation rate thereof over a very broad range of frequency sweep. More specifically, the present invention provides a system for achieving linear FM with a voltage tuned magnetron employing a delay line as a reference element, which coupled with a phase detector, in which the output at a mixing element combines portions of the delayed and undelayed output signal of the voltage tuned magnetron is compared in phase with a stable reference oscillator to obtain a correction voltage which is applied additively to the frequency control voltage of the magnetron to correct for deviations from linearity in the time rate of change of output frequency. The frequency of the reference oscillator is determined by the design of the delay line.

BRIEF DESCRIPTON OF THE DRAWING

The only figure is a schematic in block form of the voltage tuned oscillator embodying the improved control circuitry.

DESCRIPTION OF THE PREFERRED EMBODIMENT

Referring now to the drawing, a microwave voltage tunable oscillator which may be a conventional voltage tuned magnetron is schematically depicted at 10. Magnetron 10 may be of the type wherein the potential between the cathode and grid is kept constant and the potential between the anode and the grid is varied to vary the frequency of oscillations developed by the magnetron oscillator while the amplitude remains constant. The potential between the anode and grid is varied by the application of an increasing or decreasing sawtooth voltage developed by sweep circuit 12. Known circuit techniques such as Bootstrap sweep circuits, Miller integrator sweep circuits, Phantastron or Sanatron sweep circuits can be utilized to generate the required sawtooth voltage.

The radio frequency output from magnetron oscillator 10 is distributed via line 14 to a delay circuit 16. This circuit must be nondispersive; that is, a device that provides the same delay independent of frequency. Low loss coaxial cable has this characteristic and may be satisfactorily used for delay circuit 16.

A conventional microwave frequency mixer 18 is provided to mix the input and output of the delay circuit via lines 20 and 22, respectively, and develop a signal frequency in line 24 which is proportional to the length of the delay and rate of voltage sweep on, and consequently the output frequency variation rate of, magnetron 10. Signal in line 24 is then amplitude limited in limiter 26, which may be any conventional-type that removes amplitude variations while inherently preserving the phase or frequency information.

Comparing the signals from limiter 26 via line 28 and from a reference oscillator 30 via line 32 is a phase detector 34. The frequency of oscillator 30 is determined by the length of the delay circuit 16 and the desired rate of sweep of magnetron 10. The output signal from detector 34 is suitably amplified at 36 and applied via line 38 to a voltage adder 40, which might typically comprise a unit of gain amplifier as shown schematically.

To provide synchronization of the start of the sawtooth sweep voltage with a known phase of the reference oscillator 30, the axis crossings of the reference oscillator are counted and then divided down in a conventional divide down circuit 42. The trigger pulse from circuit 42 then actuates via line 44 the sweep circuit 12 at prescribed times coincident with the axis crossing of the reference oscillator frequency.

From the foregoing the operation of the improved linear frequency modulator transmitter should be readily apparent. Thus, if delay circuit 16 introduces a time delay between the signal in line 20 and that in line 22 such that mixer output in line 24 will be, say, one megacycle when the frequency in line 22 is increasing linearly, then reference oscillator will be chosen to generate a fixed frequency signal of one megacycle. As long as the frequency in line 14 varies linearly, the output of phase detector 34 will be zero and therefore no correction voltage will be applied through line 38 to the magnetron 10. However, should a frequency difference exist between the mixer and reference oscillator outputs, indicating a nonlinearity of frequency rate in output line 22, then a correction signal will be generated by the phase detector 34 and applied to magnetron 10 via 36, 38 and 40.

As mentioned earlier, divide down circuit 42 is provided to synchronize the correction or error signal in line 38 with the control voltage emanating from sweep circuit 12.

Basically, then, what has been provided according to the present invention is a system to maintain a voltage on the voltage tuned magnetron which will produce a linear frequency modulated output. If the sawtooth sweep circuit or the mangetron is not linear, which is usually the case, this deviation from linearity is sensed by the action of the delay circuit, mixer and reference oscillator as a difference in phase signal. This signal is then fed back to input voltage on the magnetron to correct the rate of sweep frequency, thereby producing a more linear output.

The system described is suitable for operation over the radar microwave frequency band of, say, 2,000 to 16,000 megacycles.

Other modifications will occur to those skilled in the art without departing from the spirit of the present invention. For example, a backward microwave oscillator may be utilized instead of the magnetron described, supra; in which case, the sweep circuit would be parabolic instead of linear and obtained by integrating the linear sweep as is known.

What is claimed is:
1. A linearly frequency modulating system, comprising;
    (a) voltage tunable oscillator means for developing an output signal of linearly variable frequency in response to a variable voltage input,
    (b) sensing means for developing a signal in response to the time rate of change of the linearly variable frequency of said output signal, and
    (c) means for controlling said variable voltage input to said oscillator means in accordance with deviations by said last mentioned signal from a constant value.
2. The system according to claim 1, wherein;
    (d) said oscillator means comprises a voltage tunable cavity magnetron.
3. The system according to claim 2, wherein;
    (e) said sensing means includes a nondispersive delay circuit in the output from said magnetron.
4. A system according to claim 3, wherein;
    (f) said sensing means further includes a mixer responsive to the input and output of said delay circuit, and
    (g) wherein said means for controlling said variable voltage input to said oscillator comprises a reference oscillator for generating a fixed frequency signal and, a phase detector for comparing the outputs of said mixer and said reference oscillator.
5. The system according to claim 1, wherein; said sensing means comprises;
    (d) a delay circuit in the output of said oscillator,
    (e) a mixer responsive to the undelayed and delayed portions of said output signal, and
    (f) a limiter responsive to the output of said mixer.
6. A system according to claim 5, wherein said means for controlling the said variable voltage input to said oscillator comprises;
    (g) a reference oscillator for generating a fixed frequency signal, and
    (h) a phase detector for comparing the output of said limiter with the output of said reference oscillator.
7. A system according to claim 6, wherein;
    (i) said oscillator means comprises a voltage tuned cavity magnetron.
8. In a linear frequency modulating system, comprising;
    (a) voltage tunable oscillator means for developing an output signal of linearly variable frequency in response to a variable voltage input,
    (b) delay circuit means located in said output for introducing a fixed time delay in said output signal,
    (c) first means for developing a signal proportional to the difference in frequency between the undelayed and the delayed output signal,
    (d) reference oscillating means generating a constant frequency signal, and
    (e) means responsive to output of said reference oscillator and said first means for developing a correction voltage applicable to the variable voltage input to said voltage tunable oscillator.

References Cited
UNITED STATES PATENTS

| | | | |
|---|---|---|---|
| 2,490,007 | 11/1949 | Peters | 332—19 X |
| 2,555,150 | 5/1951 | Norton | 332—5 |
| 2,799,828 | 7/1957 | Webber | 332—5 |
| 2,831,974 | 4/1958 | Wright et al. | 332—5 X |
| 3,360,741 | 12/1967 | Kuhn | 331—25 X |

ALFRED L. BRODY, Primary Examiner

U.S. Cl. X.R.
320—230; 331—5, 23, 25; 332—19